United States Patent [19]

Rouse et al.

[11] 3,982,229

[45] Sept. 21, 1976

[54] COMBINATIONAL LOGIC ARRANGEMENT

[75] Inventors: David Michael Rouse, Columbus, Ohio; Betty Ann Sproule, Odessa, Tex.

[73] Assignee: Bell Telephone Laboratories, Incorporated, Murray Hill, N.J.

[22] Filed: Jan. 8, 1975

[21] Appl. No.: 539,328

[52] U.S. Cl. ............................................. 340/172.5
[51] Int. Cl.² .......................................... G06F 7/00
[58] Field of Search................. 340/172.5; 235/157; 445/1

[56] References Cited
UNITED STATES PATENTS

| | | | |
|---|---|---|---|
| 2,969,913 | 1/1961 | Cherin et al. | 235/157 |
| 3,346,727 | 10/1967 | Lethin et al. | 235/160 |
| 3,360,779 | 12/1967 | Ulrich | 340/172.5 |
| 3,374,463 | 3/1968 | Muir | 340/172.5 |
| 3,790,960 | 2/1974 | Amdahl et al. | 340/172.5 |
| 3,846,759 | 11/1974 | Drake et al. | 340/172.5 |

*Primary Examiner*—Mark E. Nusbaum
*Attorney, Agent, or Firm*—J. W. Falk; M. S. Landis

[57] ABSTRACT

Disclosed is a combinational logic arrangement for use in a data processor that selectively performs a plurality of bit manipulations or logic operations including shift, rotate, and insert under mask. The arrangement is controlled by a single instruction format which specifies the parameters needed for each of the operations. The logic arrangement interprets a data word as a bit string with two boundary lines that divide the string into three regions: left region, quantum region and right region. The logic circuit operates upon the left and/or right regions of an output word to either clear all bits, set all bits, propagate the sign bit of an input word or retain the information in the left and right regions of an input data word. The circuit then inserts a quantum of bits obtained from a specified region of another input data word into the output data word starting at any desired location.

11 Claims, 7 Drawing Figures

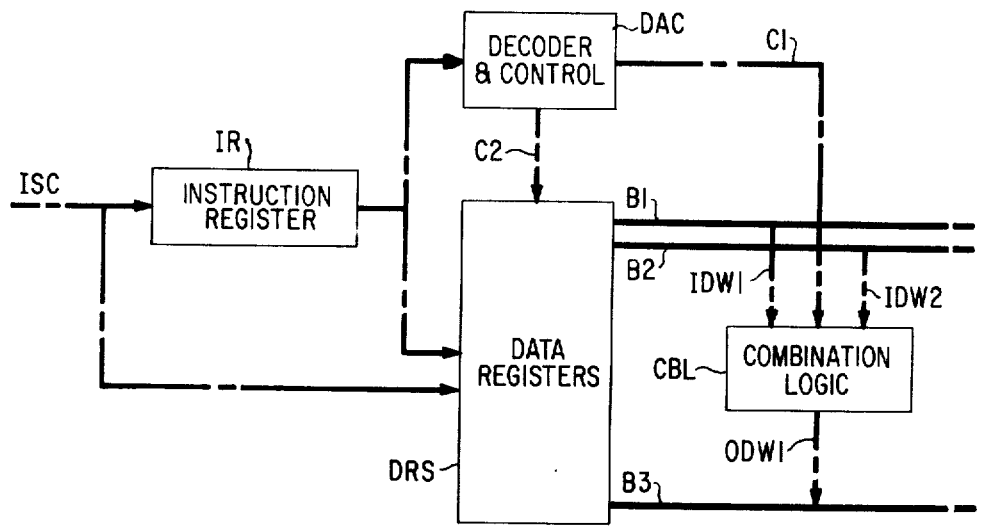
FIG. 1
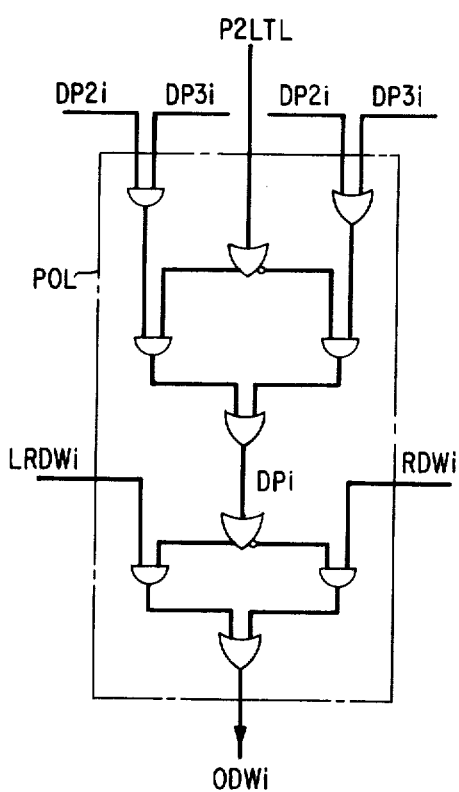
FIG. 4
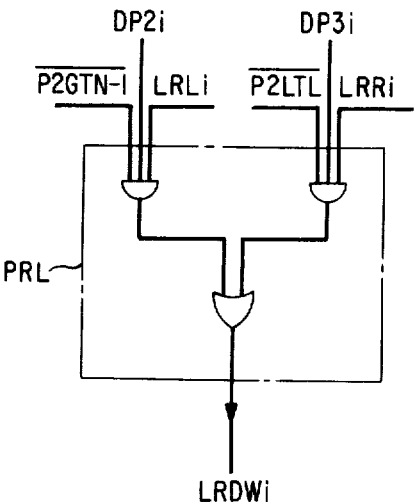
FIG. 3
FIG. 7
| OPC | OPT | R1 | R2 | R3 | P1 | P2 | L |

COMBINATIONAL LOGIC ARRANGEMENT

FIELD OF THE INVENTION

This invention is concerned with a combinational logic unit for use in a data processor which performs a plurality of logical operations upon input data words supplied thereto. More particularly, the invention concerns combinational logic for inserting a specified quantum of bits obtained from one input data word into any specified location within an output data word, for performing various specified optional logic functions and for inserting the results of such logic operations into the regions to the left and right of the quantum in the output data word.

BACKGROUND OF THE INVENTION

Binary data manipulation is fundamental to all types of data processing. In many process control types of data processing systems, the data base of the system consists of many quanta of binary data. One example of such a system is a program controlled telephone switching system. In such a system these quanta of binary data range in size from a single bit to a size larger than a single memory word. Individual bits may represent, for example, the busy/idle states of lines or trunks or other system elements. A group of N bits may identify up to $2^N$ peripheral units of a given type. Economic considerations preclude storing only a single quantum per memory location. All of the bits of the memory should be sufficiently utilized. Consequently, binary data manipulation of less than full data words is fundamental to telephone call processing.

The packing and unpacking of memory locations requires two basic operations: alignment and insertion. Alignment refers to the operation of moving a quantum of bits from one location in a data word to another location. This alignment is presently accomplished with shift and rotate instructions in most processors. The second operation, insertion, refers to placing a field of data from one data word into the same location within a second data word. This operation is usually accomplished with a mask which indicates with binary ones those bit positions of the first word which are to be inserted into the second word.

In order to accomplish alignment and insertion, existing processors use separate, rotate, shift, and insert under mask instructions in various combinations to perform the necessary data manipulation functions. Such combinations of individual instructions require substantial execution time of the processor and therefore are inefficient from a real time standpoint.

It is an object of our invention to utilize a single instruction to control an efficient data manipulation logic arrangement in the performance of shift, rotate, insert under mask operations in various combinations.

SUMMARY OF THE INVENTION

In accordance with the principles of our invention the string of bits contained in a data word of N bits is viewed as having two boundary lines which divide the string into three regions. The center region is defined to be a quantum. For illustrative purposes, bit positions are designated 0 through (N−1) with the leftmost bit position of the data word being designated (N−1) and the rightmost bit position of the word being designated 0. A combinational logic unit is selectively controlled in accordance with parameters defined in a single instruction word to insert a defined quantum from one input data word into any location of an output data word and to perform selected logic operational functions and insert the results thereof into regions to the left and right of the quantum in the output data word. The quantum and/or one of the regions may have a length of zero bits depending upon the position of the boundary lines, but the operations are performed in the same manner. The sum of the lengths of the quantum and the two regions is equal to the length N of the input data word and the output data word.

The logical functions performed by our invention can be described in two steps. First, the left and/or right regions are (1) reset to all binary zeros (ZRO), (2) set to all binary ones (SET), (3) conditioned so that all bits are equal to the sign bit of an input data word (SGN) or (4) conditioned to duplicate the corresponding bits of an input data word (B2NC). Second, the quantum, starting at a given location in an input data word is inserted into the output data word starting at a specified location therein, and results of the first logic functions are inserted in the remaining portions of the output data word.

The instruction format utilized to control the combinational logic circuit includes the following parameters:

P1 — the position of the leftmost (most significant) bit of the quantum in an input data word.

P2 — the position of the leftmost (most significant) bit of the quantum of the output data word into which the quantum of the input data word is to be inserted.

L — the number of bits in the quantum.

Left option — the logical operation LZRO, LSET, LSGN or LB2NC, whose result will appear in the left region of the output data word.

Right option — the logical operation RZRO, RSET, RSGN or RB2NC whose result will appear in the right region of the output data word.

As noted above, bit positions of all data words are valued from 0 to (N−1) beginning with the rightmost bit position of the word.

The combinational logic circuit performs two sets of operations in parallel and then combines their results. First, the input data word which contains the quantum of length L bits whose leftmost bit is in bit position P1 is rotated to the right by the number of bit positions equal to (P1−P2) modulo N, where N is the number of bits in the input data word. If the result of subtracting P2 from P1 is equal to zero, no rotation occurs. If P2 is greater than P1, the result will appear as if it had been rotated (P2−P1) or |(P1−P2)| bit positions to the left. The data word resulting from the rotation is applied to another logic circuit as described later herein.

At the same time that the rotation operation is being performed, as described above, a selected logical function is being performed. The operation defined by the left option field is performed on bits beginning with bit (N−1) and ending with bit (P2+1). At the same time, the operation specified by the right option field of the instruction is performed on bits beginning with (P2−L) and ending with bit zero. If P2 is equal to (N−1), no left operation if performed. If L is greater than P2, no right operation is performed.

When the ZRO option is specified, all bits in the specified region(s) left and/or right are reset to binary 0. The SET option sets all bits of the specfied region(s) to binary 1. The SGN option propagates the sign bit from bit position (N−1) of the input data word into all bits of the specified region(s). The B2NC option retains the values for each bit from another input data word in their corresponding bit positions of the specified region(s).

Finally, the combinational logic circuit combines the result of the rotate operation and the results of the operational logical functions so as to insert the quantum of length L from the first input data word into the result of the operational logical functions with the leftmost bit of the quantum being inserted into bit position P2 to form an output data word. If the quantum length L is greater than (P2+1), then the leftmost (P2+1) bits of the quantum are inserted into the bit positions starting at P2 through bit position zero and the remaining (L−P2−1) bits of the quantum are inserted beginning at bit position (N−1) and ending with bit position (N−L+P2+1). If L is equal to zero, no insertion occurs.

BRIEF DESCRIPTION OF THE DRAWING

FIG. 1 is a block diagram showing portions of a representative data processor in which our invention can be advantageously used;

FIG. 3 is a logic diagram illustrating a single bit gating arrangement within pre-insertion logic PRL of FIG. 2;

FIG. 4 is a logic diagram representing a single bit gating arrangement within post-insertion logic POL of FIG. 2;

FIG. 7 represents an illustrative organization of control information fields within a single instruction for controlling the combinational logic arrangement of FIG. 2.

I. DETAILED DESCRIPTION OF THE INVENTION

1. General Description — FIGS. 1 and 7

FIG. 1 represents portions of an illustrative data processor in which a combinational logic arrangement in accordance with the present invention can be advantageously employed. Only those elements of the data processor necessary for an understanding of the present invention are shown in FIG. 1, it being understood that other elements needed to immplement the operations of a data processor would be provided, as is well known in the art.

Instruction register IR temporarily stores control information (instructions) for controlling the operation of the illustrative data processor, as is known in the data processing art. This information can be obtained from any suitable source, as represented by cable ISC. The decoding and control section DAC decodes the control information present in the instruction register IR and generates appropriate control and information signals on control cables C1 and C2. In response to the signals received over cable C1, combinational logic CBL performs specified logical operations upon input data words appearing on data buses B1 and B2 and supplies the results of such logical operations to data bus B3. The control signals on cable C2 selectively control the accessing of a plurality of N bit data registers DRS. In response to the control signals on cable C2, information is transmitted from one or more selected data registers DRS onto the N bit data buses B1 and B2, and the information provided to the N bit data bus B3 by logic CBL is written into a selected one of the data registers DRS.

Figure 2:
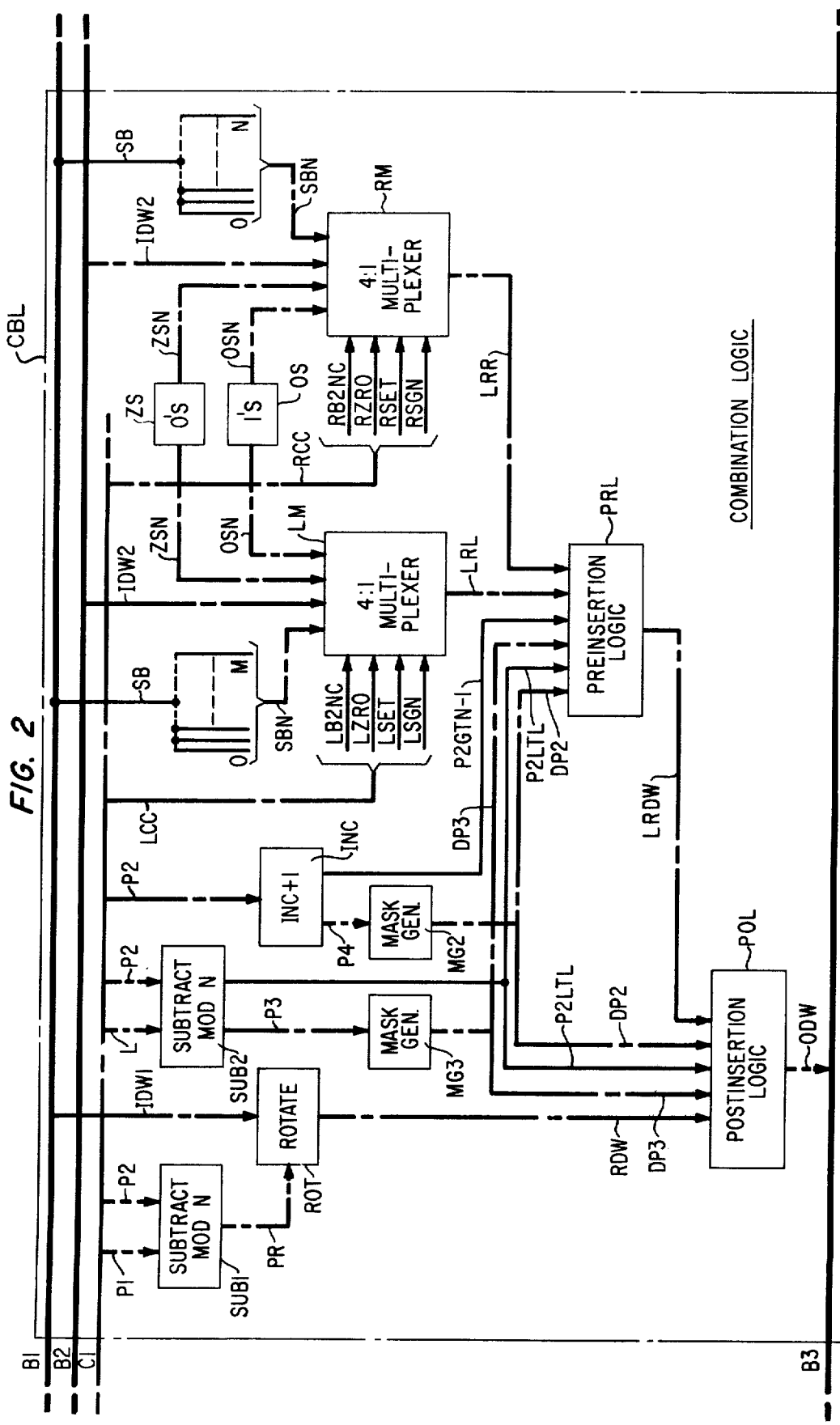
FIG. 2 is a block diagram of an illustrative combinational logic arrangement organized in accordance with the principles of our invention.

FIG. 7 illustrates the format of an instruction suitable for defining the parameters necessary for controlling the logic illustrated in FIG. 2. This instruction is stored in register IR. Bit positions of all data words are valued from (N−1) to 0 beginning with the leftmost bit position of the word. N equals the total number of bit positions. The instruction word shown in FIG. 7 includes the following fields:

Field L defines the number of adjacent bits in a portion (i.e., quantum) of the N bit input data word appearing on bus B1.

P1 defines the bit position of the N bit input data word appearing on bus B1 which contains the leftmost (most significant) one of the L adjacent bits.

Field P2 defines the bit position of the N bit output data word supplied to bus B3 into which the leftmost (most significant) one of the L adjacent bits of the N bit input data word on bus B1 will be inserted.

Field OPT defines the optional left and right logical operations to be performed whose results will be placed in the bit positions to the left and/or to the right of the L adjacent bits in the output data word. These optional logical operations include, for example:

LSGN — insert the sign bit of the N bit input data word appearing upon bus B1 into all bits of the N bit output data word to the left of the L adjacent bits.

RSGN — insert the sign bit of the input data word appearing upon bus B1 into all bits of the output data word to the right of the L adjacent bits.

LSET — insert binary ones in all bit positions of the N bit output data word to the left of the L adjacent bits.

RSET — insert binary ones in all bit positions of the output data word to the right of the L adjacent bits.

LZRO — insert binary zeros in all bit positions of the N bit output data word to the left of the L adjacent bits.

RZRO — insert binary zeros in all bit positions of the output data word to the right of the L adjacent bits.

LB2NC — insert, without change, the bits of the N bit input data word appearing on bus B2 into the corresponding bit positions to the left of the L adjacent bits in the N bit output data word supplied to bus B3.

RB2NC — insert, without change, the bits of the input data word appearing on bus B2 into the corresponding bit positions to the right of the L adjacent bits in the output data word supplied to bus B3.

Fields R1, R2 and R3 define the respective source and destination data registers within registers DRS for the N bit input data word(s) and the N bit output data word.

Field OPC defines the operation code of the instruction.

These fields are decoded by decoder and control unit DAC which places appropriate control signals on the conductors of cables C1 and C2.

2. Combination Logic — FIG. 2

Since all elements of the combinational logic CBL shown in FIG. 2 are concurrently enabled, there is no sequential timing needed or shown in FIG. 2. It is assumed that all elements of the combinational logic CBL are concurrently enabled by control unit DAC as a result of the decoding of the operation code field OPC of the instruction presently stored in register IR, as is well known in the art.

The values P1 and P2 are supplied to subtraction logic SUB1 over cables P1 and P2 from the appropriate conductors of cable C1. Subtraction logic SUB1 performs a modulo N subtraction operation to determine the difference between P1 and P2. The result of this subtraction [(P1−P2) modulo N] is applied as control information over cable PR to rotate logic circuit ROT.

The N bit input data word appearing on bus B1 is supplied over cable IDW1 to rotate ROT. The value [(P1−P2) modulo N] derived by subtraction logic SUB1 controls rotate logic ROT to rotate the input data word received through cable IDW1 from bus B1 to the right by a number of bits equal to [(P1−P2) modulo N]. If P1 is equal to P2, no rotation occurs. If P2 is greater than P1, the rotated data word will appear as if the input data word had been rotated to the left by a number of bit positions equal to (P2−P1) or |(P1−P2)|. The resulting rotated data word is supplied over cable RDW to post-insertion logic POL.

Modulo N subtraction circuits such as SUB1 are well-known standard, integrated circuit chips. A specific known-circuit is subsequently identified as exemplary. Rotate circuits such as rotate logic ROT also are well known in the art, as illustrated by U.S. Pat. No. 3,374,463 which issued Mar. 19, 1968.

The value P2 is also applied over cable P2 to incrementor INC which adds one to the value P2. The result of this addition (P2+1) is supplied over cable P4 to mask generator MG2. Incrementor INC provides a signal on lead P2GTN-1 if a carry is generated by incrementor INC, indicating that the value P2 is equal to (N−1).

The values L and P2 are supplied over cables L and P2 to subtraction logic SUB2 which performs a modulo N subtraction function to determine the difference between values P2 and L. As noted above, such subtraction circuits are well known in the art and are not described in detail herein. The result of the subtraction (P2−L) is supplied over cable P3 to mask generator MG3. If the result of the subtraction operation by SUB2 indicates that the value P2 is less than the value L, subtraction logic SUB2 places a signal on lead P2LTL.

Decoding of the option fields OPT of the instruction in register IR by control unit DAC results in the energizing of one of the leads in cable LCC and one of the leads in cable RCC, which are connected respectively to the 4:1 multiplexer units LM and RM.

Each of the multiplexer units LM and RM is supplied with four sets of N bit inputs, a selected one of which is gated through each of the multiplexers LM and RM and respectively applied to the output cables LRL and LRR. Fixed potential source OS provides a potential representative of a binary one to all of the N leads of cables OSN. Fixed potential source ZS provides a potential representing a binary zero to all of the N leads of cables ZSN. Cables IDW2 connect the N leads of bus B2 to the multiplexers LM and RM thereby providing the input data word appearing upon bus B2 to both of these multiplexers. Conductors SB are connected to each of the N leads of cable SBN so that every lead of the cables SBN is propagating the sign bit of the input data word appearing upon bus B1.

The multiplexers LM and RM are selectively controlled by the signals applied thereto over the respective conductors of cables LCC and RCC. A signal on conductor LSGN controls multiplexer LM to transmit the information on cable SBN to cable LRL. A signal on lead LSET controls multiplexer LM to transmit the information on cable OSN to cable LRL. A signal on cable LZRO controls multiplexer LM to transmit the information on cable OSN to cable LRL. A signal on conductor LB2NC controls multiplexer LM to transmit information on cable IDW2 to cable LRL. Multiplexer RM is similarly controlled by signals on conductors RSGN, RSET, RZRO and RB2NC to transmit information to cable LRR. Thus, the result of the operation of multiplexer LM is transmitted as an N bit word via cable LRL to pre-insertion logic PRL and the result of the operation of multiplexer RM is transmitted as an N bit data word via cable LRR to pre-insertion logic PRL.

3. Mask Generators — FIGS. 5 and 6

Figure 5:
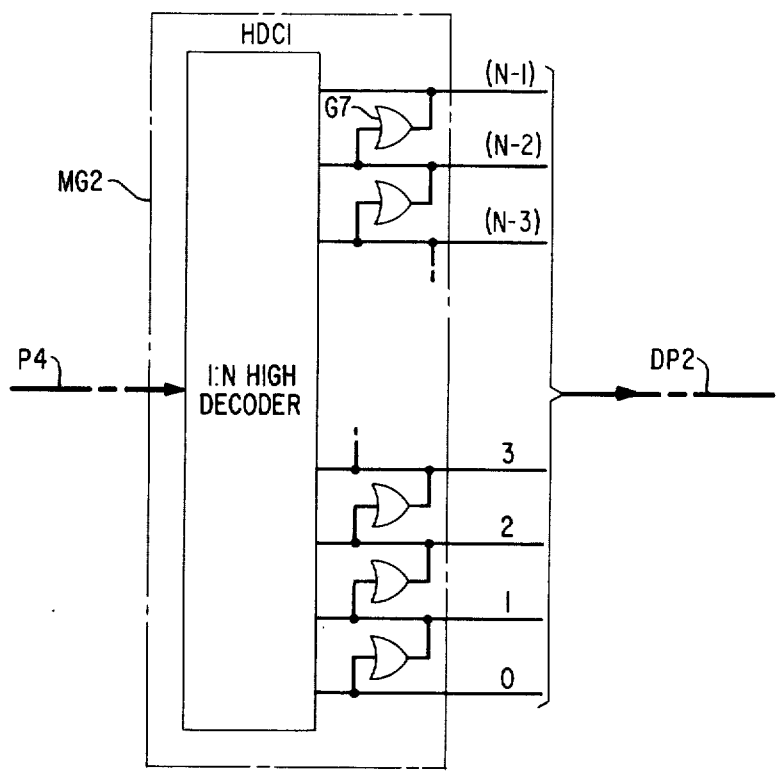
FIG. 5 is a logic diagram of mask generator MG2 of FIG. 2.

As noted above, the value (P2+1) generated by incrementor INC is applied over cable P4 to mask generator MG2. FIG. 5 is a logical representation of an illustrative mask generator which can be used as mask generator MG2. Mask generator MG2 generates a mask to which is applied the output information from multiplexer LM appearing on cable LRL. This masking operation is performed in pre-insertion logic PRL and results in masking out all information on cable LRL except that information in bit positions to the left of bit position P2. Thus, the mask generated by mask generator MG2 will contain binary ones in bit positions (P2+1) through bit position (N−1). This mask information is transmitted over cable DP2 to pre-insertion logic PRL.

Figure 6:
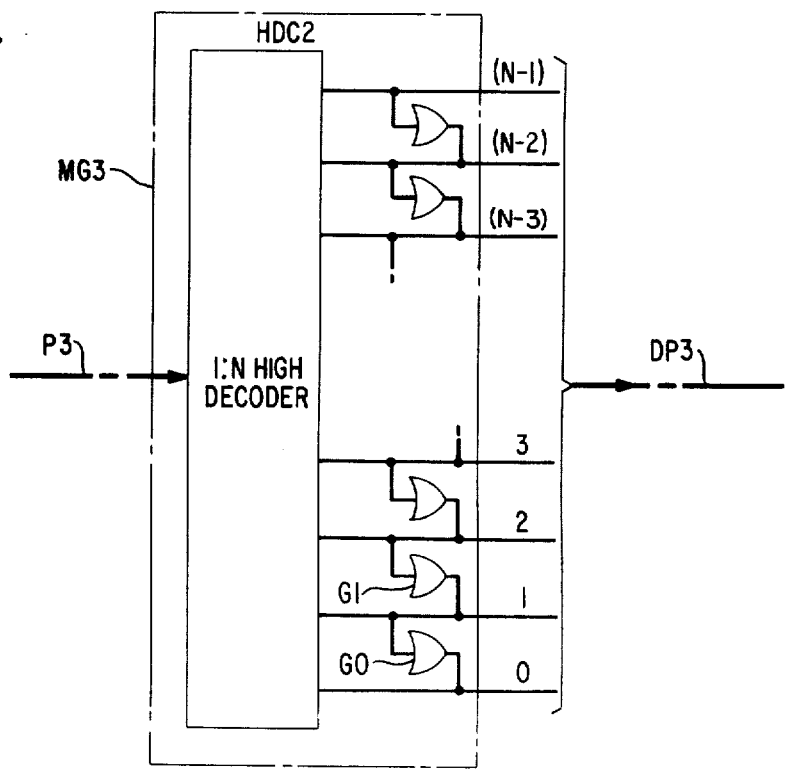
FIG. 6 is a logic diagram of mask generator MG3 of FIG. 2.

As described above, the value (P2−L) generated by subtraction logic SUB2 is applied over cable P3 to mask generator MG3. FIG. 6 is a logical representation of an illustrative mask generator which can be used as mask generator MG3. Mask generator MG3 generates a mask to which is applied the output information from multiplexer RM appearing on cable LRR. This masking operation is performed in pre-insertion logic PRL and results in masking out all information on cable LRR except that information in bit position (P2−L) and bit positions to the right thereof. Thus, the mask generated by mask generator MG3 will contain binary ones in bit position zero through bit position (P2−L). This mask information is transmitted over cable DP3 to pre-insertion logic PRL.

4. Insertion Logic Circuits — FIGS. 3 and 4

FIG. 3 illustrates the logic of pre-insertion logic PRL for a single bit position, (i.e., bit $i$). Pre-insertion logic PRL actually includes N such logic arrangements, one for each bit of the N bit data words handled by combinational logic CBL. The following Boolean equation defines the logical organization of pre-insertion logic PRL in terms of its inputs and output:

$$LRDW = \overline{|P2GTN-1|} \cdot DP2 \cdot LRL + \overline{P2LTL} \cdot DP3 \cdot LRR$$

In accordance with the above-defined logic, pre-insertion logic PRL inserts the information received from multiplexers LM and RM into those bit positions of an N bit data word identified by binary ones in the mask information supplied over cables DP2 and DP3. The resulting data word appears on cable LRDW. Wrap-around of insertion is prevented by pre-insertion logic PRL if P2 is less than L or if P2 is equal to (N−1). These conditions are indicated, respectively, by the presence of a signal on conductor P2LTL and the presence of a signal on conductor P2GTN-1. Thus, the output of the pre-insertion logic PRL appearing on cable LRDW is an N bit data word reflecting the results of the operations of multiplexers LM and RM, respectively, to the left and the right of a region comprising L bit positions beginning with bit position P2.

The logical result data word appearing on cable LRDW and the rotated data word appearing on cable RDW are provided as inputs to post-insertion logic POL. In addition, the mask information appearing on cables DP2 and DP3 is provided to post-insertion logic POL.

FIG. 4 shows the logical organization for manipulating data associated with a single bit (i.e., bit $i$) of the output word to be generated by post-insertion logic POL. Actually, there are N such logic arrangements in post-insertion logic POL, one for each bit of the N bit output data word to be generated. The Boolean equations defining the logical operations of the two stage post-insertion logic POL are:

$$DP = DP2 \cdot DP3 \cdot P2LTL + (DP2 + DP3) \cdot \overline{P2LTL} \quad 1.$$
$$ODW = LRDW \cdot DP + RDW \cdot \overline{DP} \quad 2.$$

Thus, post-insertion logic POL combines the logical result data word produced by the masking functions of pre-insertion logic PRL with the result of the rotation operation performed by rotate logic ROT. The actual mask DP used by post-insertion logic POL is derived from the mask information appearing on cables DP2 and DP3. A further input to post-insertion logic POL is lead P2LTL which is energized if P2 is less than L. Therefore, if P2 is greater than or equal to (P2−L), the mask information DP is the logical OR function of the two masks DP2 and DP3. If however, (P2−L) is greater than P2, then the mask DP is the logical AND function of the two masks DP2 and DP3. The result of the operations of post-insertion logic POL is applied over cable ODW as an N bit output data word to bus B3. As noted above, bus B3 provides a data path back to the data registers DRS and to other locations within the illustrative data processor.

II. Illustrative Example of Operation

For purposes of illustration it is assumed that instruction register IR (FIG. 1) has been loaded with an instruction having the format shown in FIG. 7 in which the operation code field OPC specifies the use of combinational logic CBL. Decoding of fields OPC, R1, R2, and R3 by decoder and control unit DAC results in control signals to the data registers DRS causing a first data word (e.g., 10110111) to be gated from a register defined by field R1 onto bus B1; a data word (e.g., 00111010) to be gated from a register defined by field R2 onto bus B2; and to provide a gating path from bus B3 to a data register defined by field R3. The register defined by field R3 may be the same as either of the registers defined by fields R1 and R2 and any combination of the registers DRS can be specified by the fields R1, R2 and R3.

It is further assumed that all of the data paths and registers are arranged for 8 bit data words. Therefore, in all instances N is equal to 8 for purposes of this illustration.

The other fields of the instruction registered in instruction register IR are assumed to be as follows:

P1 = 3
P2 = 5
L = 3
Left option = LSET
Right option = RB2NC

In accordance with the parameters and options noted above, execution of this instruction will cause a three bit quantum of the input data word obtained from register R1 whose leftmost bit is in bit position 3 of that data word [i.e., 1011(011)1] to be inserted into an output data word with its leftmost bit appearing in bit position 5 of the output data word [i.e., . . (011) . . . ]. Binary ones will be placed in the bit positions 6 and 7 of the output data word which are to the left of the quantum [i.e., 11(011) . . . ]. The bit positions 0, 1 and 2 of the output data word to the right of the quantum will have inserted therein the bits in the corresponding bit positions 0, 1 and 2 of the data word obtained from the register defined by the field R2 [i.e., 11(011)010].

As noted above, the parameters defined by the instruction registered in register IR are transmitted over cable C1 to combinational logic CBL. The parameters P1 and P2 are applied from cable C1 over cables P1 and P2 to subtraction logic SUB1 which subtracts P2 from P1. Since P1 = 3 and P2 = 5, the result of this subtraction is negative 2, which is supplied as control information over cable PR to rotate circuit ROT. Since P2 is greater than P1, rotate circuit ROT will perform a left rotate operation. Cable IDW1 connects bus B1 to rotate circuit ROT and supplies thereto the data word placed upon bus B1, i.e., 10110111. This first input data word is rotated two bit positions to the left responsive to the subtraction information supplied over cable PR. The resulting rotated data word appearing on cable RDW is 11011110, which is applied to post-insertion logic POL.

The parameters P2 and L are supplied from cable C1 over cables P2 and L to subtraction logic SUB2 which performs a subtraction of L from P2. Since P2 = 5 and L = 3, the result of this subtraction is equal to 2, which is provided over cable P3 to mask generator MG3. Since P2 is not less than L (i.e., 5 is not less than 3), there is no signal applied to lead P2LTL, i.e., P2LTL = 0.

The parameter P2 is also provided to incrementor logic INC which adds the quantity 1 to P2. Since P2 = 5, the result of this addition (P2+1) is 6, which is supplied over cable P4 to mask generator MG2. Since P2 is not equal to N−1 (i.e., 5 not equal to 7), no signal is applied to lead P2GTN−1, i.e., P2GTN−1 = 0.

FIG. 6 illustrates mask generator MG3. As noted above, the quantity 2 is supplied as an input to mask generator MG3 over cable P3. This represents the leftmost bit position to the right of the quantum destination in the output data word. The 1:N decoder HDC2 in FIG. 6 places a signal on its output conductor corresponding to the value provided over cable P3. Thus, a signal is placed on output conductor 2 of cable DP3.

This signal is also propagated from conductor 2 to conductors 1 and 0 of cable DP3 through gates G1 and G0. Thus a mask word is generated having binary ones in bit positions 0, 1 and 2 and binary zeros in the remaining bit positions (i.e., 00000111). This mask word is provided over cable DP3 to pre-insertion logic PRL and postinsertion logic POL.

Mask generator MG2 is illustrated in FIG. 5. As noted earlier, the quantity 6 is provided over cable P4 to mask generator MG2. The 1:N decoder HDC1 incorporated in FIG. 5 causes a signal to be placed on the output conductor of cable DP2 corresponding to the value provided on cable P4. Since N equals 8, the value 6 equals (N−2). Thus, a signal is placed on the output conductor (N−2) which is propagated through gate G7 to output conductor (N−1) as well. Since N equals 8, a mask word is thereby generated having binary ones in bit positions 6 and 7 and binary zeros in all other bit positions (i.e., 11000000). This mask word is provided over cable DP2 to pre-insertion logic PRL and post-insertion logic POL.

As a result of the decoding by control unit DAC of the instruction option field OPT registered in instruction register IR, conductors LSET and RB2NC of cable C1 are energized. In response to the energizing of conductor LSET, multiplexer LM gates the information on cable OSN to cable LRL. Cable OSN provides a data word containing all binary ones. Therefore, the data word on cable LRL is 11111111. As a result of the energizing of conductor RB2NC, multiplexer RM gates the information on cable IDW2 to cable LRR. The information on cable IDW2 is the data word appearing on bus B2, which was obtained from the register specified by field R2. Therefore, the data word gated to cable LRR by multiplexer RM is 00111010.

As noted above, the Boolean equation for the logic contained in pre-insertion logic PRL is $$LRDW = (\overline{P2GTN-1}) \cdot DP2 \cdot LRL + \overline{P2LTL} \cdot DP3 \cdot LRR$$

Since $P2GTN-1$ equals 0, $\overline{P2GTN-1}$ equals 1, and since $P2LTL$ equals 0, $\overline{P2LTL}$ equals 1. The first term of the above equation is derived as follows from the information supplied over cables DP2 and LRL and lead P2GTN-1:

$$DP2 = 11000000$$

and
$$LRL = 11111111$$

and
$$\overline{P2GTN-1} = 11111111/11000000$$

The second term of the above equation is derived as follows from the information supplied over cables DP3 and LRR and lead P2LTL:

$$DP3 = 00000111$$

and
$$LRR = 00111010$$

and
$$\overline{P2LTL} = 11111111/00000010$$

The information appearing on cable LRDW is equal to the logical OR function of the above two terms of the equation

11000000 or
$$LRDW = 00000010/11000010$$

Thus, the logical result data word supplied over cable LRDW to post-insertion logic POL is 11000010.

As indicated earlier, the equations for the two stages of logic incorporated in post-insertion logic POL are as follows:

$$DP = DP2 \cdot DP3 \cdot \overline{P2LTL} + (D\underline{P2} + DP3) \cdot P2LTL \quad 1.$$
$$ODW = LRDW \cdot DP + RDW \cdot \overline{DP} \quad 2.$$

The first term of Equation (1) above is derived from the information provided over cables DP2 and DP3 and lead P2LTL as follows:

$$DP2 = 11000000$$

and
$$DP3 = 00000111$$

and
$$P2LTL = 00000000/00000000$$

The second term of Equation (1) is derived from the information on cables DP2 and DP3 and lead P2LTL as follows:

$$DP2 = 11000000$$

or
$$DP3 = 00000111/11000111$$

and
$$\overline{P2LTL} = 11111111/11000111$$

Taking the logical OR function of the two terms of Equation (1)

00000000 or
$$DP = 11000111/11000111$$

The first term of Equation (2) above is derived from the information on cable LRDW and DP derived above:

$$LRDW = 11000010$$

and
$$DP = 11000111/11000010$$

The second term of Equation (2) above is derived from the information on cable RDW and DP derived above:

$$RDW = 11011110$$

and
$$\overline{DP} = 00111000/00011000$$

The output data word placed on cable ODW is the logical OR function of the two terms of Equation (2) as derived above:

11000010 or
$$ODW = 00011000/11011010$$

This output data word is placed on bus B3 from cable ODW and gated from bus B3 into the register defined by field R3 of the instruction.

III. Other Examples of Operations

The combinational logic unit CBL can perform a number of different useful operations by appropriate selection of values for the parameters P1, P2 and L and for the option and register selection fields. The operations can be performed using one, two, or three registers depending upon appropriate use of the register fields R1, R2, and R3. For all types of instructions, the operation can be performed with the initial contents of the input registers(s) R1 and/or R2 being retained. A number of exemplary types of useful operations will now be described with respect to data words having N bits.

Example 1

Place a quantum of length S from R1 starting at location I of R1 into R3 starting at location D and place the results of optional logic operations on R1 or R2 to the left and/or right of the quantum in R3.

P1 = I
P2 = D
L = S
Left option = LB2NC, LZRO, LSET or LSGN
Right option = RB2NC, RZRO, LSET or RSGN This is the most general format of the instruction for controlling the logic unit CBL. All of the following types of instructions are special cases of this format.

Example 2

Insert R1 into R2 under mask of size S at displacement D and place result in R3.

P1 = D
P2 = D
L = S
Left option = LB2NC
Right option = RB2NC

The insert under mask instruction assumes that the desired mask is composed of a field of continuous binary ones which is bounded by fields of binary zeros. The bit position of the leftmost one in the mask field is designated by the displacement D and the number of ones in the mask is designated by its length S. If the desired mask does not satisfy the assumption, more than one operation is used to perform the insert under mask operation. All possible masks can be constructed with a suitable sequence of operations.

Example 3

Align fields of R1 and R2, insert R1 into R2 under mask of size S at displacement D, and place result in R3.

P1 = I
P2 = D
L = S
Left option = LB2NC
Right option = RB2NC

In this operation a rotation function procedes the insertion function. The input data word from R1 is rotated (I-D) modulo N bits to the right in order to align the field to be inserted with its specified destination in R3.

Example 4

Rotate R1 right M bits and place result in R3.

P1 = M
P2 = O
L = N
Left option = LB2NC
Right option = RB2NC

P1 and P2 may be defined in any manner so long as (P1−P2) modulo N is equal to M.

Example 5

Rotate R1 left M bits and place result in R3.

P1 = O
P2 = M
L = N
Left option = LB2NC
Right option = RB2NC

Example 6

Shift R1 left logical M bits and place result in R3.

P1 = (N−M−1)
P2 = −1)
L = (N−M)
Left option = LB2NC
Right option = RZRO

Example 7

Shift R1 right logical M bits and place result in R3.

P1 = (N−1)
P2 = (N−M−1)
L = (N−M)
Left option = LZRO
Right option = RB2NC.

Example 8

Shift R1 left arithmetic M bits and place result in R3.

P1 = (N−M−2)
P2 = (N−2)
L = (N−M−1)
Left option = LSGN
Right option = RZRO

In an arithmetic shift, the sign bit appearing at bit position (N−1) of the input word from R1 is preserved in bit position (N−1) of the outpt data word placed in R3.

Example 9

Shift R1 right arithmetic M bits and place result in R3.

P1 = (N−2)
P2 = (N−M−2)
L = (N−M−1)
Left option = LSGN
Right option = RB2NC.

Example 10

Right justify a data field of length M from R1 starting at bit position I and place result in R3.

P1 = I
P2 = (M−1)
L = M
Left option = either LZRO or LSGN, as desired,
Right option = RB2NC This instruction is particularly useful in data processors having memories which are word addressable. Through the use of this instruction any bit or byte of an input data word can be right justified for examination.

Example 11

Clear M bits of R1 starting at bit position I and place result in R3.

P1 = (I−M) modulo N
P2 = (I−M) modulo N
L = (N−M)
Left option = LZRO
Right option = RZRO This instruction allows a specified quantum of bits from R1 to be set to zero using only a single instruction and a single register if R1=R3. This is possible because of the wrap-around capability of the insertion operations performed. The quantum region of the output data word is cleared and all bits except those in the quantum are copied from the input data word from R1 into the output data word which is returned to the register.

Example 12

Set M bits of R1 starting at bit position I and place result in R3.

P1 = (I−M) modulo N
P2 = (I−M) modulo N
L = (N−M)
Left option = LSET
Right option = RSET This example is the same as Example 11 except that the bits of the specified quantum are set to binary ones rather than binary zeros.

Example 13

Move register R1 to register R3.

P1 = (N−1)
P2 = P1
L = N
Left option = LB2NC
Right option = RB2NC

This operation does not perform any rotation or insertion. P1 can be specified to be any bit position from zero to (N−1). The source and destination registers are defined by fields R1 and R3 of the instruction.

Example 14

Exchange halves of register R1 and place result in R3.

P1 = (N/2 − 1)
P2 = (N−1)
L = N
Left option = LB2NC
Right option = RB2NC

This operation is particularly useful in 16 bit data processors where processing is frequently performed upon eight bit bytes.

Example 15

Clear a register, i.e., place binary zeros in all bit positions of the register defined by field R3.

P1 = 0
P2 = P1
L = 0
Left option = LZRO
Right option = RZRO

This operation can be performed with P1 equal to any bit position from zero to (N−1).

Example 16

Set a register, i.e., place binary ones in all bit positions of the register specified by field R3.

P1 = 0
P2 = P1
L = 0
Left option = LSET
Right option = RSET

This operation also can be performed with P1 equal to any bit position from zero to (N−1). This type of operation is particularly useful in data processors executing two's complement arithmetic since it generates the constant −1.

Example 17

Generate a mask word with binary ones to the right of bit position M and binary zeros in the remainder of the mask word and place the mask word in R3.

P1 = M
P2 = M
L = 0
Left option = LZRO
Right option = RSET

This type of operation is useful in the creation of a diagonal matrix of vectors of binary ones and zeros. It also allows for generation of positive constants in the form $(2^{M+1} - 1)$.

Example 18

Generate a mask word with binary zeros to the right of bit position M and binary ones in the remainder of the mask word and place the mask word in R3.

P1 = M
P2 = M
L = 0
Left option = LSET
Right option = RZRO

This type of operation is useful for generating negative constants in the form $-2^{(M+1)}$.

IV. Conclusion

The combinational logic arrangement CBL illustrated in FIG. 2 is comprised of a plurality of interconnected logic elements, each of which by itself is well known in the art. The following table provides a list of integrated circuits, each described in the "MECL Integrated Circuits Data Book" published by Motorola Semiconductor Products Inc. The listed circuits perform the functions ascribed to the corresponding logic elements shown in FIGS. 2 through 6.

| FIGS. 2–6 | MECL 10,000 Series |
| --- | --- |
| Subtractors SUB1 & SUB2 (FIG. 2) | MC10181 |
| Incrementor INC (FIG. 2) | MC10136 |
| Multiplexer LM (FIG. 2) | MC10174 |
| Multiplexer RM (FIG. 2) | MC10174 |
| Logic POL (FIG. 4) | MC10104, MC10103 and MC10159 |
| Logic PRL (FIG. 3) | MC10108, MC10103 |
| Decoder HDC1 (FIG. 5) | MC10162 |
| Decoder HDC (FIG. 6) | MC10162 |
| Gates G0, G1, etc. (FIGS. 5,6) | MC10101 |

These and other commercially available logical elements can readily be employed in a combinational logic arrangement in accordance with the teaching of our invention as illustrated in FIGS. 2–6 of the drawing by one skilled in the art of logic design.

Numerous other types of useful data manipulation operations can be performed by the combinational logic arrangement, CBL, of our invention through appropriate selection of the parameters and options available in the instruction format.

What is claimed is:

1. In a data processor for processing N bit data words whose bit positions are respectively designated (N−1) through zero starting with the leftmost bit position of a data word and having control means for specifying:
   a value L defining the number of adjacent bits in a portion of an N bit input data word,
   a value P1 defining the bit position of said input data word which contains the leftmost one of said L adjacent bits,
   a value P2 defining a bit position in an N bit output data word, and
   an option code defining at least one of a plurality of logical operations;
   a combinational logic arrangement comprising:
   first combinational logic means connected to and controlled by said control means for selectively performing the logical operations defined by said option code to produce an N bit logical result data word,
   and second combinational logic means connected to receive said logical result data word from said first logic means and connected to and controlled by said control means for inserting the respective L bits in bit positions P1 through (P1−L+1) of said input data word into bit positions P2 through (P2−L+1) of said logical result data word to produce said output data word, whereby the output word represents the logical result data word as masked by selected bits of the input data word.

2. In a data processor according to claim 1, said combinational logic arrangement wherein said first logic means includes:
   first insertion means selectively controlled by said control means for performing a selected first logical operation and inserting the result thereof into bit positions (P2-L) through zero of said logical result data word,
   second insertion means selectively controlled by said control means for performing a selected second logical operation and inserting the result thereof into bit positions (N−1) through (P2+1) of said logical result data word, and
   means for inserting a binary zero in each of the remaining bit positions of said logical result data word.

3. In said data processor according to claim 1, a combinational logic arrangement wherein said first logic means includes:
   first insertion means selectively controlled by said control means for inserting into each of the bit positions (P2-L) through zero of said logical result data word a binary zero, a binary one, the sign bit of an input data word, or the bit in the respectively corresponding bit position of an input data word;
   second insertion means selectively controlled by said control means for inserting into each of the bit positions (N−1) through (P2+1) of said logical result data word a binary zero, a binary one, the sign bit of an input data word, or the bit in the respectively corresponding bit position of an input data word;
   and means for inserting a binary zero in each of the remaining bit positions of said logical result data word.

4. In a data processor according to claim 2, said combinational logic arrangement further comprising means connected to said control means for providing a first indication when P2 is equal to (N−1),
   means for providing a second indication when P2 is less than L,
   means controlled by said control means and responsive to said first indication for inhibiting said second insertion means, and
   means controlled by said control means and responsive to said second indication for inhibiting said first insertion means.

5. In a data processor according to claim 4, said combinational logic arrangement wherein said second logic means comprises means controlled by said control means and responsive to said second indication for inserting the leftmost (P2+1) bits of said L adjacent bits in bit positions P1 through (P1−L+1) of said input data word into bit positions P2 through zero of said logical result data word and for inserting the rightmost (L−P2−1) bits of said L bits in bit positions P1 through (P1−L+1) of said input data word into bit positions (N−1) through (N−L+P2+1) of said logical result data word.

6. In a data processor according to claim 2, said combinational logic arrangement wherein said first logic means further includes:
   first mask generating means for generating a first mask word having a binary one in each bit position thereof to the left of bit position P2 and a binary zero in all other bit positions thereof,
   second mask generating means for generating a second mask word having a binary one in each bit position thereof to the right of bit position (P2−L+1) and a binary zero in all other bit positions thereof, said first insertion means being connected to said second mask generating means and controlled by said second mask word to insert bits into only those bit positions of said logical result data word which correspond to bit positions of said second mask word containing a binary one, and said second insertion means being connected to said first mask generating means and controlled by said first mask word to insert bits into only those bit positions of said logical result data word which correspond to bit positions of said first mask word containing a binary one.

7. In a data processor according to claim 6, said combinational logic arrangement wherein said first logic means further includes:

means controlled by said control means for inhibiting said second insertion means when P2 is equal to (N−1), and means controlled by said control means for inhibiting said first insertion means when P2 is less than L.

8. In a data processor according to claim 7, said combinational logic arrangement wherein said second logic means comprises:

rotate logic means controlled by said control means for rotating the bits of said input data word to the right by a number of bit positions equal to (P1−P2) to produce a rotated data word.

9. In a data processor according to claim 8, said combinational logic arrangement wherein said second logic means comprises:

third mask generating means connected to said first and second mask generating means and controlled by said control means to generate a third mask word representing either the logical OR function of said first and second mask words when P2 is equal to or greater than L or the logical AND function of said first and second mask words when P2 is less than L, third insertion means controlled by said third mask word for inserting bits of said logical result data word into only those bit positions of said output data word which correspond to bit positions of said third mask word containing a binary one, and fourth insertion means controlled by said third mask word for inserting bits of said rotated data word into only those bit positions of said output data word which correspond to bit positions of said third mask word containing a binary zero.

10. In a data processor for processing N bit data words whose bit positions are respectively and sequentially designated (N−1) through zero starting with the leftmost bit position and ending with the rightmost bit position, and having control means for specifying:

a value L defining the number of adjacent bits in a portion of an N bit input data word, a value P1 defining the bit position of said input data word which contains the left most one of said L adjacent bits, a value P2 defining a bit position in an N bit output data word, and an option code defining at least one of a plurality of logical operations;

a combinational logic arrangement comprising:

rotate means for rotating the bits of said input data word to the right by a number of bit positions equal to (P1−P2) modulo N to produce a rotated data word, first mask generating means controlled by said control means for generating a first mask word having a binary one in each of the bit positions (N−1) through (P2+1) and binary zeros in all other bit positions, second mask generating means for generating a second mask word having a binary one in each of the bit positions (P2−L) through zero and binary zeros in all other bit positions, first logic means for performing a first logical operation defined by said option code, second logic means for performing a second logical operation defined by said option code, first insertion means connected to said first mask generating means and said first logic means and controlled by said first mask word for inserting only those bits of the result of said first logical operation in bit positions (N−1) through (P2+1) thereof into corresponding bit positions of a logical result data word, second insertion means connected to said second mask generating means and said second logic means and controlled by said second mask word for inserting only those bits of the result of said second logical operation in bit positions (P2−L) through zero thereof into corresponding bit positions of said logical result data word, means controlled by said first and second insertion means for inserting a binary zero into all other bit positions of said logical result data word, means controlled by said control means for inhibiting said first insertion means when P2 is equal to (N−1), means controlled by said control means for inhibiting said second insertion means when P2 is less than L, third mask generating means controlled by said control means to generate a third mask word representing either the logical OR function of said first and second mask words when P2 is equal to or greater than L or the logical AND function of said first and second mask words when P2 is less than L, and third insertion means connected to said first and second insertion means and said rotate means and controlled by said third mask word for inserting those bits of said logical result data word in bit positions corresponding to bit positions of said third mask word containing binary ones into corresponding bit positions of said output data word and for inserting those bits of said rotated data word in bit positions corresponding to bit positions of said third mask word containing binary zeros into corresponding bit positions of said output data word.

11. In a data processor including control means for specifying option instructions which define at least one of a plurality of logical operations, combinational logic circuit comprising a subtractor circuit responsive to the bit position of a start bit of a quantum of bits in an input data word and to an indication of the intended bit position of the start bit in an output data word for generating a rotate indication defining the number of bit positions that the quantum must be rotated, a rotate circuit responsive to the rotate indication and to said input data word for rotating said input data word the number of bit positions indicated by said rotate indication, first and second mask generators for respectively generating masks for bit positions before and after the quantum in the output data word, first and second multiplexers responsive to said option instructions for respectively generating the bit values of the bit positions of the output data word before and after the quantum in the output data word, a first insertion logic circuit responsive to said masks and to said bit values generated by said multiplexers for generating a logical result data word with said bit values in the bit positions before and after the quantum in the output data word, and a second insertion logic circuit responsive to said logical result data word, said masks and said rotated input data word for generating an output data word with the quantum in the defined rotated position and the generated bit values in the bit positions before and after the quantum.

* * * * *